United States Patent [19]
Takeda et al.

[11] Patent Number: 6,028,121
[45] Date of Patent: Feb. 22, 2000

[54] PRE-EXPANDED POLYETHYLENE BEADS AND PROCESS FOR PRODUCING THE SAME THEREOF

[75] Inventors: Noboru Takeda; Yutaka Nakayama, both of Suzuka, Japan

[73] Assignee: Asahi Kasei Kogyo Kabushiki Kaisha, Osaka, Japan

[21] Appl. No.: 09/068,729

[22] PCT Filed: Nov. 13, 1996

[86] PCT No.: PCT/JP96/03330

§ 371 Date: May 15, 1998

§ 102(e) Date: May 15, 1998

[87] PCT Pub. No.: WO97/18260

PCT Pub. Date: May 22, 1997

[30] Foreign Application Priority Data

Nov. 15, 1995 [JP] Japan .................................. 7-319828

[51] Int. Cl.[7] .................................. C08J 9/16; C08J 9/22
[52] U.S. Cl. .................................. 521/56; 264/50; 264/53; 521/142; 525/240
[58] Field of Search ........................ 521/56, 142; 264/50, 264/53; 525/240

[56] References Cited

U.S. PATENT DOCUMENTS

| | | | |
|---|---|---|---|
| 2,957,859 | 10/1960 | Mertes | 521/56 |
| 4,540,718 | 9/1985 | Senda et al. | 521/56 |
| 4,617,322 | 10/1986 | Senda et al. | 521/56 |
| 4,861,531 | 8/1989 | Maeda | 264/50 |
| 4,948,817 | 8/1990 | Kuwabara et al. | 521/56 |
| 4,968,723 | 11/1990 | Senda et al. | 521/56 |
| 5,053,435 | 10/1991 | Kuwabara et al. | 521/56 |
| 5,229,049 | 7/1993 | Maeda | 521/56 |
| 5,348,984 | 9/1994 | Lee | 264/50 |
| 5,430,069 | 7/1995 | Ogita et al. | 521/56 |
| 5,459,169 | 10/1995 | Tokoro et al. . | |

FOREIGN PATENT DOCUMENTS

| | | | |
|---|---|---|---|
| 56-28837 | 3/1981 | Japan | 264/53 |
| 60-10047 | 3/1985 | Japan . | |
| 60-10048 | 3/1985 | Japan . | |
| 61-185536 | 8/1986 | Japan | 521/56 |
| 6-157803 | 6/1994 | Japan . | |
| 6-192464 | 7/1994 | Japan | 521/56 |
| 6-316645 | 11/1994 | Japan | 521/56 |
| 7-90104 | 4/1995 | Japan . | |
| 8-73533 | 3/1996 | Japan . | |

*Primary Examiner*—Allan R. Kuhns
*Attorney, Agent, or Firm*—Birch, Stewart, Kolasch & Birch, LLP

[57] ABSTRACT

The present invention provides pre-expanded non-crosslinked polyethylene resin beads which are made of a mixed resin, as a base resin, comprising a high-pressure-process low-density polyethylene, a linear low-density polyethylene, and a linear high-density polyethylene and, when analyzed with a differential scanning calorimeter (DSC), give a fusion endothermic curve which is a mountain-shaped curve having a single peak and in which, when the peak point of the mountain-shaped curve is referred to as A, the point of intersection of the perpendicular line drawn to the temperature axis from A and the base line of the fusion endothermic curve is referred to as B, and the two points at which the straight line drawn through the point C interiorly dividing segment AB in the perpendicular line in a ratio of 9:1 and parallel to the temperature axis intersects the fusion endothermic curve are referred to as D and E, then that temperature width of the mountain-shaped curve part which is the length of segment DE is 15° C. or more. The present invention further provides a process for producing the pre-expanded beads. The pre-expanded beads of the present invention are applicable to in-mold molding for producing molded articles of complicated shapes, and the moldings satisfy the desired compression strength even when having a high expansion ratio.

14 Claims, 4 Drawing Sheets

UNIT: mm

UNIT: mm

PRE-EXPANDED POLYETHYLENE BEADS AND PROCESS FOR PRODUCING THE SAME THEREOF

This application is the national phase under 35 U.S.C. §371 of prior PCT International Application No. PCT/JP96/03330, which has an International filing date of Nov. 13, 1996, which designated the United States of America, the entire contents of which are hereby incorporated by reference.

TECHNICAL FIELD

The present invention relates to pre-expanded noncrosslinked polyethylene resin beads which are packed into a mold having a desired shape and expansion-molded with heating with a heating medium such as steam to give a foamed molding for use mainly as a cushioning material, heat insulator, float, etc. The present invention also relates to a process for producing the beads and a process for producing a molding from the same.

BACKGROUND OF THE INVENTION

In recent years, pre-expanded beads of not a crosslinked polyethylene resin but a noncrosslinked polyethylene resin are being developed because of advantages thereof that some steps including the step of crosslinking are unnecessary and recycling is possible (see, for example, JP-B-60-10047, JP-B-60-10048, JP-A-6-316645, JP-A-6-157803, etc.). (The terms "JP-B" and "JP-A" as used herein mean an "examined Japanese patent publication" and an "unexamined published Japanese patent application", respectively.) These techniques are intended to eliminate the drawback in expansion molding using a polyethylene resin as a feedstock resin wherein when the resin has not been modified by crosslinking, pre-expanded beads of satisfactory quality cannot be obtained therefrom and a foamed molding suitable for practical use cannot hence be obtained, and to enable pre-expanded beads and foamed moldings of satisfactory quality to be obtained through the foaming of a noncrosslinked polyethylene resin.

Difficulties in the foaming of polyethylene resins are attributable to the fact that a considerable proportion of the foaming agent (inorganic gas) infiltrated into beads escapes during heating for foaming, thereby making it difficult to obtain expanded beads having an expected cell structure and expansion ratio, and that the resins have a large temperature dependence of melt viscosity, thereby making it difficult to regulate the melt viscosity so as to be suitable for foaming. In this connection, the temperature range in which noncrosslinked high-pressure-process low-density polyethylene resins can retain a melt viscosity suitable for foaming is said to be 1° C. at the most. Because of the difficult in controling the temperature, optimal foaming is difficult. For example, JP-A-6-316645 discloses pre-expanded beads obtained using as a base resin a noncrosslinked ethylene resin that has a specific melt viscosity range so as to impart excellent in-mold moldability to the pre-expanded beads, and also discloses, as an example of the base resin having such specific viscosity properties, a mixed resin comprising a linear low-density polyethylene having a resin density of from 0.920 to 0.940 g/cm³ and a high-density polyethylene having a resin density of 0.940 g/cm³ or higher. Further, JP-A-6-157803 discloses noncrosslinked pre-expanded beads made of a mixed resin, as a base resin, comprising from 20 to 85 wt % low-density polyethylene, from 0 to 45 wt % linear low-density polyethylene, and from 0 to 40 wt % high-density polyethylene and having a resin density of from 0.920 to 0.940 g/cm³ and also discloses a process for producing the same, in order to provide molded foams equal to molded foams of crosslinked polyethylene resins in flexibility, toughness, and durability in compression strain and to provide pre-expanded beads of a noncrosslinked polyethylene resin which are excellent in the ability to expand during in-mold molding and in fusibility.

There is a recent trend in the market wherein foamed moldings are having more complicated three-dimensional shapes. For example, FIG. 1 shows an example of foamed moldings of complicated shapes which are highly desired in the market; the example shown is a set of cushioning foamed moldings for use in the assembly packaging of liquid-crystal modules. FIG. 1 (A) and (B) show foamed moldings of the same shape, which are put together in such a manner that a liquid-crystal module (D) is sandwiched therebetween and are then put in a corrugated fiberboard container (C). The frame 1 and the partitions 2 in FIG. 1 (B) have been formed according to the shape of the liquid-crystal module (D) in order to firmly hold the module, while the projections 3 to 5 in FIG. 1 (A) and the projections 6 and 7 in FIG. 1 (B) have been disposed for the purpose of cushioning the impact as a result of falling, etc. and are shaped in a manner which is less apt to break or damage. Since users of cushioning assembly packaging materials desire to maximize the number of articles to be packed per package in order to reduce transportation cost, a strategy for increasing the capacity of the packaging material is to reduce the thickness of the frame and partitions as much as possible while still preventing damage to the contents. In the example shown, the frame 1 and the partitions 2 have thin-wall parts having a thickness as small as about 10 mm. As a result of market demand to reduce the amount of expanded beads per unit and to reduce the transportation cost by heightening the efficiency of packaging as described above, foamed moldings (especially for use as cushioning materials) generally have complicated shapes having many thick and thin parts and many recessed and projected parts.

Another important objective is to further increase the strength (rigidity) of foamed moldings. In cushioning material applications, foamed moldings having a higher strength can have a reduced contents-supporting area while still maintaining the required cushioning performance, and reducing the wall thickness. In addition, such higher-strength foamed moldings can lower the weight per unit (by a reduction in bulk density) which has not been attained with any conventional pre-expanded beads, whereby a further reduction in the amount of expanded beads per unit is possible.

Under these circumstances, moldings having many recessed and projected parts are desired to have a higher level of appearance, i.e., greater in-mold moldability, and a greater level of compression strength than are currently available.

However, it is extremely difficult to produce a foamed molding of a complicated shape such as that shown in FIG. 1, which achieves the desired performance, by in-mold hot molding from any of the conventional pre-expanded noncrosslinked polyethylene beads including those disclosed in the references cited above. The difficulty in using a mold of a complicated shape having many recessed and projected parts and many parts for forming thick and thin walls, etc., is the thin-wall parts of the expandable beads. (e.g., the frame 1 in FIG. 1, etc., are apt to be overheated during the heat treatment in the in-mold molding because of their good permeability to steam, while thick-wall parts (projected parts, e.g., projections with a height of about 50 mm such as those shown by numerals 3 to 5 in FIG. 1 (A) and by 6 and 7 in FIG. 1 (B)). Are less apt to be thoroughly because of their low permeability to steam, and parts like the partitions 2 are apt to develop hot spots, for example, because steam holes become disposed therearound face to face at a small distance and interference among steam streams occurs to inhibit temperature rising. If the heating temperature for the molding is adjusted to a value at which the parts likely to suffer overheating neither shrink nor deteriorate, the resulting molding partly has insufficient fusion bonding between beads. Thus, heating spots tend to be formed. If the heating temperature for the molding is adjusted to a value suitable for the parts less apt to be heated, a defective molding results which has partly undergone cell breakage and shrinkage.

The cell breakage and shrinkage phenomena are attributable to properties of the pre-expanded noncrosslinked polyethylene resin beads, that is, a small difference between the temperature at which the expanded beads begin to fuse and the temperature at which the expanded beads begin to undergo cell breakage and shrinkage (a narrow range of heating temperatures suitable for molding). In addition, in actual long-term production, the steam molding pressure always fluctuates due to fluctuations of pressure of the steam source, etc., so that molding cannot be performed at a constant heating temperature. Therefore, in order to attain stable production with a low percentage of rejects during a long-term production operation, it is necessary to widen the range of heating temperatures suitable for molding upon comparison with conventional compositions.

In order to highly expand pre-expanded beads to obtain a high-strength low-bulk-density foamed molding which retains intact high compression strength and rigidity, which is the other desire of the market, the base resin should have a density not lower than 0.940 g/cm$^3$. However, in conventional noncrosslinked pre-expanded beads, higher densities of the base resin tend to result in a narrower range of heating temperatures suitable for molding, and the moldings having complicated shapes cannot be obtained from just any base resin having a density of 0.940 g/cm$^3$.

Conventionally, there are two processes for producing pre-expanded beads. One process is the so-called "flash expansion method," which comprises introducing an aqueous suspension of expandable resin beads impregnated with a foaming agent into a pressure vessel, regulating the expandable resin beads in the vessel so as to have a temperature suitable for foaming, and then discharging the expandable resin beads from one end of the vessel together with the aqueous suspension medium into an atmosphere having ordinary temperature and ordinary pressure to instantaneously expand the expandable resin beads, whereby expanded beads having a desired high expansion ratio are obtained in one step. The other process is the so-called "multistage temperature-rising expansion method," which comprises infiltrating a small amount of a foaming agent into resin beads in a pressure vessel, taking out the impregnated resin beads after cooling, transferring the same to a foaming tank, heating the foaming tank to a temperature suitable for foaming to expand the resin beads to thereby obtain expanded beads having a low expansion ratio, and then subjecting the obtained expanded beads several times to a step in which an inorganic gas is forced into cells of the expanded beads in a pressure vessel to give expandable expanded beads and the expandable beads are expanded by heating to obtain expanded beads having a higher expansion ratio, whereby the expansion ratio of expanded beads is heightened stepwise. These two expansion methods were developed for polyethylene resins which have proven to be difficult to expand.

However, when the "flash expansion method" is compared with the "multistage temperature-rising expansion method" with regards to the inhibition of the flying of the foaming agent and the degree of control of the range of temperatures suitable for foaming with heating, the "flush expansion method" is more advantageous. The reasons for this are as follows. First, in the "multistage temperature-rising expansion method," the step in which expandable beads to be foamed (expanded) are heated to a temperature suitable for foaming is conducted in an open foaming tank (vessel). Because of this, the foaming agent (inorganic gas) cannot be inhibited from going away during this heating and, in addition, the method undergoes a phenomenon in which foaming (expansion) begins before the expandable beads are heated to a temperature suitable for foaming. Consequently, even though the multistage temperature-rising expansion method is applicable to resins (e.g., resins modified by crosslinking) which have a sufficiently widened range of temperatures suitable for foaming with heating (temperatures at which the viscosity is suitable for foaming), the method is unsuitable for linear high-density polyethylene resins having a narrow range of temperatures suitable for foaming because such polyethylene resins undergo a considerable disorder in cell structure during expansion, making it very difficult to obtain expanded beads from the noncrosslinked polyethylene resins. It is noted in this connection that when linear low-density polyethylene resins are used, expanded beads may be obtained therefrom by the "multistage temperature-rising expansion method" because such resins have a slightly wider range of temperatures suitable for foaming due to the function of a comonomer component. However, in this case also, these expanded beads have a disorder in cell structure caused during expansion and this disorder in cell structure prevents these pre-expanded beads from giving a molding of good quality.

In contrast, the "flash expansion method" is advantageous in that since the expandable resin beads in a closed vessel can be kept in a state suitable for foaming until discharge and expansion by regulating or controlling the pressure and temperature of the vessel. Even a resin having a relatively narrow range of temperatures suitable for foaming (viscosities suitable for foaming) can be easily expanded. As a result, pre-expanded beads having an expansion ratio as high as 60 cc/g can be obtained through one-step expansion operation.

In view of the fact that the current "multistage temperature-rising expansion method" cannot be used for obtaining expanded beads from any noncrosslinked polyethylene resin having a high density (not lower than 0.936 g/cm$^3$, especially not lower than 0.940 g/cm$^3$), it has been extremely difficult to produce expanded beads which have a wide temperature range suitable for molding as well as satisfactory basic properties.

Accordingly, an object of the present invention is to provide pre-expanded noncrosslinked polyethylene resin beads which have a wide temperature range usable in in-mold molding for producing a satisfactory molding of a complicated shape, and which can give a molding having a desired compression strength and excellent cushioning properties and still have a high expansion ratio.

Another object of the present invention is to provide a process by which expanded noncrosslinked polyethylene resin beads having the properties described above can be provided easily.

Still another object of the present invention is to provide a "multistage temperature-rising expansion method" by which expanded noncrosslinked polyethylene resin beads having the properties described above can be easily provided.

SUMMARY OF THE INVENTION

As a result of intensive studies, the present inventors have found that a mixed resin, which upon analysis with a differential scanning calorimeter (DSC) shows properties within a specific range, can give "pre-expanded beads having a wide temperature range suitable for molding as well as sufficient compression strength (expanded beads of good quality)" even when the mixed resin is a polyethylene resin having a density of 0.936 g/cm$^3$ or higher, which resin has been thought to be difficult to give such pre-expanded beads. The present invention has been completed based on this finding. Since the pre-expanded beads obtained have high compression strength properties and a wider temperature range suitable for molding, the beads can meet the desire of the market to attain a reduction in load-bearing area, a reduction in molding thickness, an increase in expansion ratio, etc., while retaining intact cushioning properties.

The present invention includes the following pre-expanded beads.

1) Pre-expanded noncrosslinked polyethylene resin beads comprising a mixed resin comprising a high-pressure-process low-density polyethylene, a linear low-density polyethylene, and a linear high-density polyethylene, characterized in that when a result of measurement of the mixed resin with a differential scanning calorimeter (DSC) at a heating rate of 10° C./min is expressed as a fusion endothermic curve, the fusion endothermic curve is a mountain-shaped curve having a single peak, and when a peak point of the mountain-shaped curve is referred to as A, a point of intersection of a perpendicular line drawn from A to the temperature axis and the base line of the fusion endothermic curve is referred to as B, a point interiorly dividing segment AB in the perpendicular line in a ratio of 9:1 is referred to as C, and two points at which a straight line drawn through C and parallel to the temperature axis intersects the fusion endothermic curve are referred to as D and E, a temperature width of the mountain-shaped curve part indicated by a length of segment DE is 15° C. or more.

2) Pre-expanded noncrosslinked polyethylene resin beads as described above, wherein the mixed resin has a resin density of from 0.936 to 0.952 g/cm$^3$.

3) Pre-expanded noncrosslinked polyethylene resin beads as described above, wherein a linear high-density polyethylene (HD1) and a linear high-density polyethylene (HD2) are used as the linear high-density polyethylene, and the linear low-density polyethylene (LL) and the linear high-density polyethylenes (HD1) and (HD2) satisfy the following expression:

(mHD2+mLL)/2−2≦mHD1≦(mHD2+mLL)/2+2

(wherein mLL, mHD1, and mHD2 represent melting points of the linear low-density polyethylene (LL), the linear high-density polyethylene (HD1), and the linear high-density polyethylene (HD2), respectively).

The present invention is also accomplished by the following process for producing pre-expanded beads:

4) A process for producing pre-expanded noncrosslinked polyethylene resin beads which comprises steps of infiltrating a foaming agent into beads of a polyethylene resin and expanding the polyethylene resin beads, characterized in that a mixed resin is used as the polyethylene resin, which comprises (i) from 30 to 50 wt % of a high-pressure-process low-density polyethylene resin having a density of from 0.920 to 0.930 g/cm$^3$ and a melting point (mLD) of from 108 to 118° C., (ii) from 5 to 30 wt % of a linear low-density polyethylene resin having a density of from 0.916 to 0.938 g/cm$^3$ and a melting point (mLL) of from 118 to 123° C., (iii) from 20 to 45 wt % of a linear high-density polyethylene resin having a density of from 0.955 to 0.970 g/cm$^3$ and a melting point (mHD2) of from 128 to 135° C., and (iv) from 10 to 35 wt % of a linear high-density polyethylene resin having a density of from 0.940 to 0.954 g/cm$^3$ and a melting point (mHD1) satisfying the following expression (1):

(mHD2+mLL)/2−2≦mHD1<(mHD2+mLL)/2+2  (1)

5) A process for producing pre-expanded noncrosslinked polyethylene resin beads as described above, wherein the mixed resin has a density of from 0.936 to 0.952 g/cm$^3$.

6) A process for producing pre-expanded noncrosslinked polyethylene resin beads as described above, wherein a multistage temperature-rising expansion method is employed, which comprises infiltrating a foaming agent into resin beads, heating the same to obtain lowly expanded beads having an expansion of from 1.5 to 3.5 cc/g, then infiltrating a foaming agent into cells of the lowly expanded beads, and heating the same to obtain expanded beads having a higher expansion.

7) A process for producing pre-expanded noncrosslinked polyethylene resin beads as described above, wherein a step, in which a foaming agent is infiltrated into cells of the lowly expanded beads and the same are heated to obtain expanded beads having a higher expansion, is repeatedly conducted from two or four times, so as to produce expanded beads having an expansion of from 6 to 60 cc/g.

DETAILED DESCRIPTION OF THE INVENTION

Figure 1:
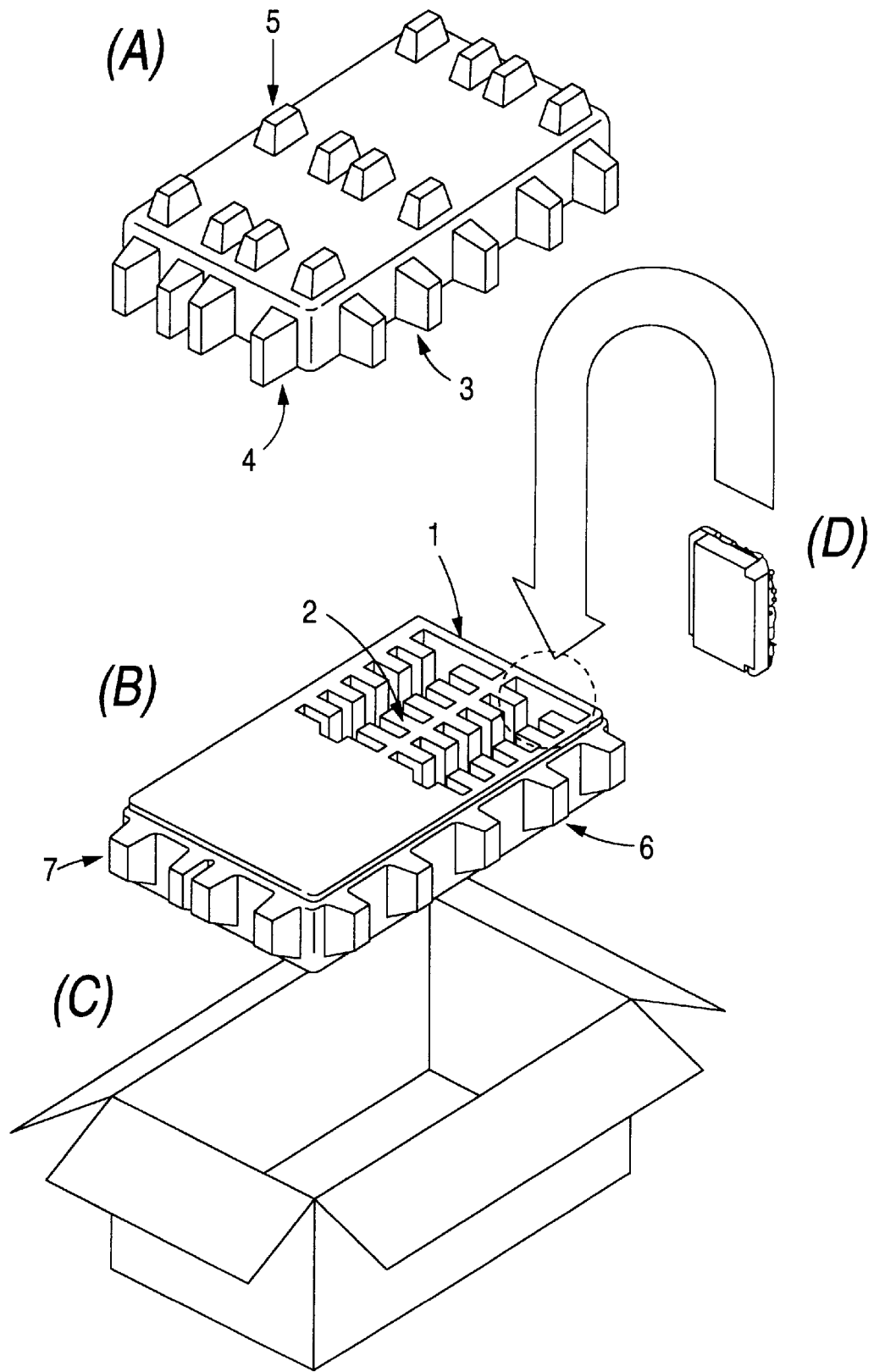
FIG. 1 is a view illustrating foamed moldings of a complicated shape highly desired in the market.

The backbone of the present invention resides in pre-expanded noncrosslinked polyethylene resin beads comprising a mixed resin comprising a high-pressure-process low-density polyethylene, a linear low-density polyethylene, and a linear high-density polyethylene, the mixed resin preferably having a resin density of from 0.936 to 0.952 g/cm$^3$. When analyzed with a differential scanning calorimeter (DSC), the mixed resin gives a fusion endothermic curve which is a mountain-shaped curve having a single peak, in which, when the peak point of the mountain-shaped curve is referred to as A, the point of intersection of the perpendicular line drawn to the temperature axis from peak point A and the base line of the fusion endothermic curve is referred to as B, the point interiorly dividing segment AB in the perpendicular line in a ratio of 9:1 is referred to as C, and the two points at which the straight line drawn through C and parallel to the temperature axis intersects the fusion endothermic curve are referred to as D and E, then that temperature width of the mountain-shaped curve part which is the length of segment DE is 15° C. or more.

The present invention will be explained below in more detail.

While the noncrosslinked polyethylene feedstock resin in the present invention is desirably a polyethylene resin in an almost completely noncrosslinked state, it may have been slightly crosslinked within the range, as far as the resin is capable of repelletization. In this case, the degree of crosslinking is up to 10% in terms of gel content.

The pre-expanded noncrosslinked polyethylene beads of the present invention, when analyzed with a differential scanning calorimeter (DSC), give a fusion endothermic curve which is a mountain-shaped curve having a single peak. This property constitutes a large difference between the beads of the present invention and the conventional pre-expanded noncrosslinked polyethylene resin beads desirably having two peaks (described, e.g., in JP-A-64-1741). Further, the noncrosslinked pre-expanded beads described in JP-A-6-157803, which are made of a three-component mixed polyethylene resin comprising a low-density polyethylene (LD), a linear low-density polyethylene (LL), and a high-density polyethylene (HD2) and having a content of the sum of the low-density polyethylene (LD) and the high-density polyethylene (HD2) of 55% by weight or higher and a mixed-resin density of from 0.920 to 0.940 g/cm$^3$, have not a single peak but two peaks.

In the present invention, the presence of a single peak indicates that in the resin constituting cell walls, i.e., in the mixed resin comprising a high-pressure-process low-density polyethylene (LD), a linear low-density polyethylene (LL), and a linear high-density polyethylene (HD), the three components are in a well compatibilized state. Namely, it means that when the mixed resin having the above property and constituting the cell walls of the pre-expanded beads fuses and flows at a molding temperature, the components interlock with one another on a molecular segment level to have the property of retaining a suitable viscosity in a wide temperature range to thereby widen the temperature range suitable for molding.

The temperature at which the single peak appears varies depending on the kind of the polyethylene resin used, and is not particularly limited. The peak temperature is generally in the range of from 122 to 128° C. and the fusion end point is generally in the range of from 124 to 134° C.

The mountain-shaped curve part should have a temperature width of 15° C. or more, which is also intended for improving the moldability of pre-expanded beads (widening the temperature range suitable for molding). This is because a mixed resin constituting the cell walls of pre-expanded beads which has a wider apparent melting point range gradually begins to fuse and flow with increasing temperature and undergoes a diminished change in viscosity with changing temperature. That is, the temperature width of 15° C. or more means that the pre-expanded beads have an enlarged difference between the temperature at which the expanded beads begin to fuse and the temperature at which the expanded beads begin to undergo cell breakage and shrinkage phenomena and thus have a widened range suitable for molding. The present inventors found that in order to produce the effects of the present invention, in particular to obtain pre-expanded beads having a wide range suitable for molding, it is important, by using the "temperature width of a mountain-shaped curve part" as an index, to specify the viscosity change with changing temperature of pre-expanded beads in the semi-fused state from the initiation to the termination of melting. They directed attention to the fact that the known prior art mixed polyethylene resins have an insufficient range suitable for molding from the standpoint of producing moldings of complicated shapes having many recessed and projected parts, since these resins do not satisfy the requirement of "single peak" and the requirement concerning "temperature width of a mountain-shaped curve part." The present inventors found the importance of the "single peak" and a preferred range of the "temperature width of a mountain-shaped curve part," and have succeeded first in providing pre-expanded noncrosslinked polyethylene mixed resin beads having these properties.

The above requirements bring about the following effect. The pre-expanded beads have improved moldability (a widened temperature range suitable for molding) and are hence capable of giving, e.g., a molding of a complicated shape which has parts having considerably different thicknesses and in which the expanded beads constituting these parts having different thicknesses have been evenly fused throughout the molding. This improved fusion in any part of the molding is an important factor for imparting the designed basic properties to the molding, and enables the whole molding to retain the thermal properties inherent in the high-density (0.936 to 0.952 g/cm$^3$) resin and to thereby attain a reduction in the load-bearing area in cushioning materials and a reduction in molding thickness.

The DSC fusion curve in the present invention is a fusion curve obtained in an analysis in which DSC-7, manufactured by Perkin-Elmer Corp., was used to heat about 2 mg of pre-expanded beads from 30° C. to 200° C. at a heating rate of 10° C./min.

Figure 3:
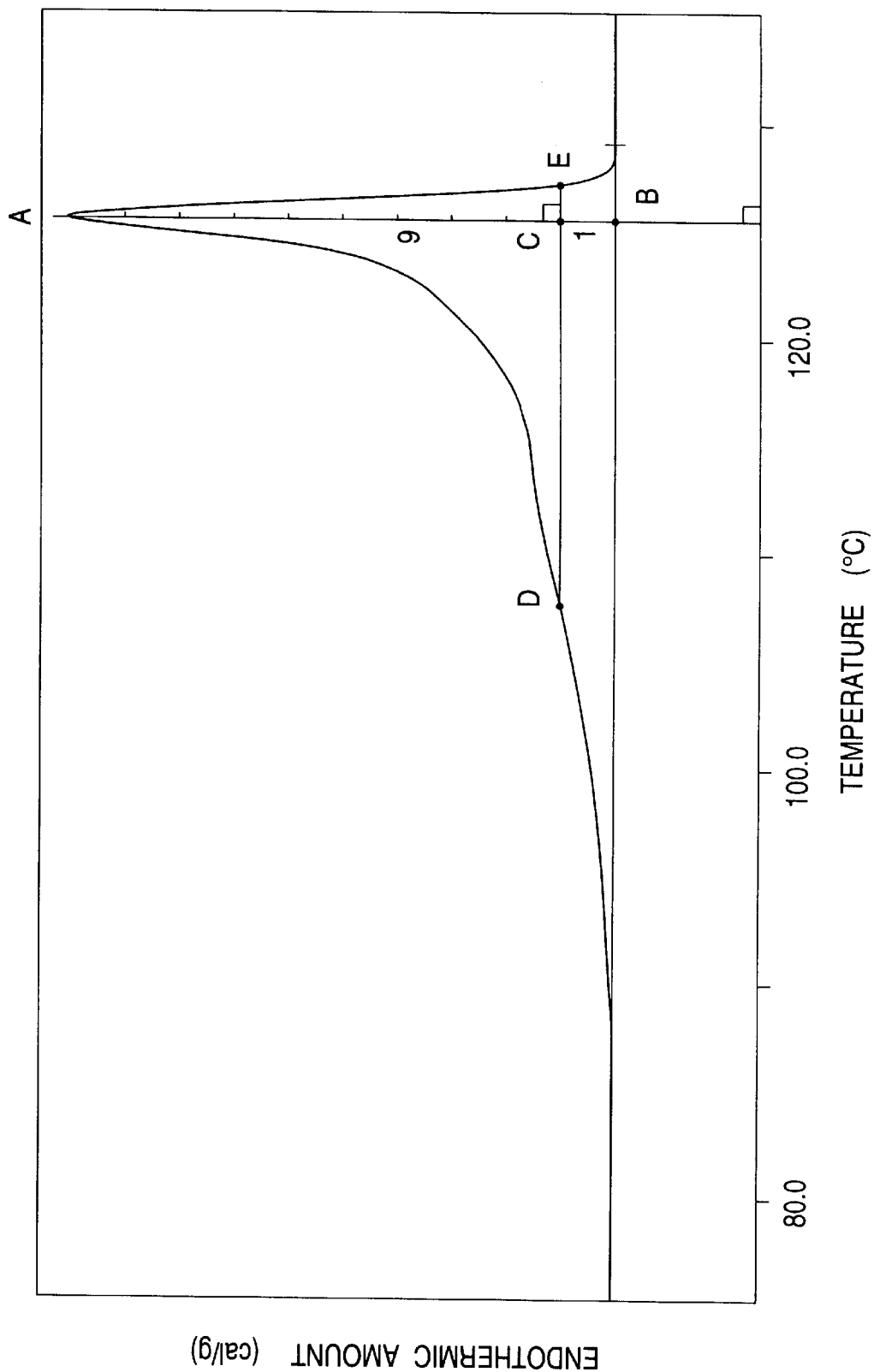
FIG. 3 illustrates a method for determining the temperature width (° C.) of a mountain-shaped curve part in the present invention.

The temperature width (° C.) of a mountain-shaped curve part is determined as follows. As shown in FIG. 3, when the peak point of the mountain-shaped curve is referred to as A, the point of intersection of the perpendicular line drawn to the temperature axis from peak point A and the base line of the fusion endothermic curve is referred to as B, the point interiorly dividing segment AB in the perpendicular line in a ratio of 9:1 is referred to as C, and the two points at which the straight line drawn through C and parallel to the temperature axis intersects the fusion endothermic curve are referred to as D and E, the temperature width of the mountain-shaped curve part can be determined from the length of segment DE.

While the upper limit of the temperature width of the mountain-shaped curve part is not particularly limited, it is generally 40° C., preferably 30° C.

It is preferred that the base resin for use in the present invention be a mixed resin comprising a high-pressure-process low-density polyethylene (LD), a linear low-density polyethylene (LL), and a linear high-density polyethylene (HD), from the standpoint of enhancing the temperature width of the mountain-shaped curve part to improve the molding properties.

Examples of the mixed resin having the DSC fusion curve properties described above include a mixed resin in which the linear high-density polyethylene (HD) consists of a linear high-density polyethylene (HD1) and another linear high-density polyethylene (HD2), and the linear low-density polyethylene (LL) and the linear high-density polyethylenes (HD1) and (HD2) preferably satisfy the following expression:

$$(mHD2+mLL)/2-2 \leq mHD1 \leq (mHD2+mLL)/2+2$$

(wherein mLL, mHD1, and mHD2 represent the melting points of the linear low-density polyethylene (LL), the linear high-density polyethylene (HD1), and the linear high-density polyethylene (HD2), respectively).

The high-pressure-process low-density polyethylene (LDPE) for use in the present invention preferably has a density of from 0.920 to 0.930 g/cm$^3$, a melting point of from 108 to 118° C., and an MI (melt index: 190° C., 2.16 kg) of from 0.05 to 30 g/10 min, more preferably from 0.1 to 5.0 g/10 min. The linear low-density polyethylene (LLDPE) is a copolymer of ethylene and at least one α-olefin having 3 to 12 carbon atoms. Examples of the α-olefin include propylene, butene-1, pentene-1, hexene-1, heptene-1, octene-1, 4-methylpentene-1, 1-decene, 1-tetradecene, and 1-octadecene; these α-olefins may be used alone or a mixture of two or more thereof. The linear low-density polyethylene has generally an α-olefin unit content of generally from 2 to 10% by mol, and preferably has a density of from 0.916 to 0.938 g/cm$^3$, a melting point of from 118 to 123° C., and an MI of from 0.1 to 30 g/10 min, more preferably from 0.1 to 5.0 g/10 min. The linear high-density polyethylene (HDPE) is a copolymer of ethylene and at least one α-olefin having 3 to 8 carbon atoms, which contains short branches and has an α-olefin unit content lower than 2% by mol. Such linear high-density polyethylenes are classified into two groups by density, i.e., HD1 for lower densities and HD2 for higher densities. Polyethylenes belonging to HD1 have a density of from 0.940 to 0.954 g/cm$^3$, a melting point of from 123 to 129° C., and an MI of from 0.05 to 30 g/10 min, preferably from 0.1 to 5.0 g/10 min. Polyethylenes belonging to HD2 have a density of from 0.955 to 0.970 g/cm$^3$, a melting point of from 128 to 135° C., and an MI of from 0.05 to 30 g/10 min, preferably from 0.1 to 5.0 g/10 min.

The resin density (g/cm$^3$) in the present invention is measured in accordance with ASTM D-1505.

The melting point (° C.) of a resin in the present invention is measured using DSC-7, manufactured by Perkin-Elmer Corp., as an analyzer by a method comprising heating about 10 mg of a sample from 30° C. to 200° C. at a heating rate of 10° C./min, maintaining the sample at that temperature for 1 minute, cooling the sample to 30° C. at a rate of 10° C./min to crystallize the same, maintaining the crystallized sample at that temperature for 1 minute, and then reheating the crystallized sample at a rate of 10°/min to obtain a fusion curve. The melting point is determined from the peak value of this fusion curve.

The melt index MI in the present invention is measured in accordance with ASTM D-1238.

The density of the mixed resin for use as a base material in the present invention is preferably from 0.936 to 0.952 g/cm$^3$, more preferably from 0.940 to 0.952 g/cm$^3$. Regulating the density thereof to 0.936 g/cm$^3$ or higher, in particular 0.940 g/cm$^3$ or higher, is intended for imparting desired properties including compression strength to the pre-expanded polyethylene resin beads (and moldings thereof) to be produced. The reason why the density thereof is regulated to 0.952 g/cm$^3$ or lower is that this is the highest mixed-resin density value obtainable with the resin make-up specified in the present invention. The substantial effect of heightening the density of a polyethylene resin is described below by reference to FIG. 2.

Figure 2:
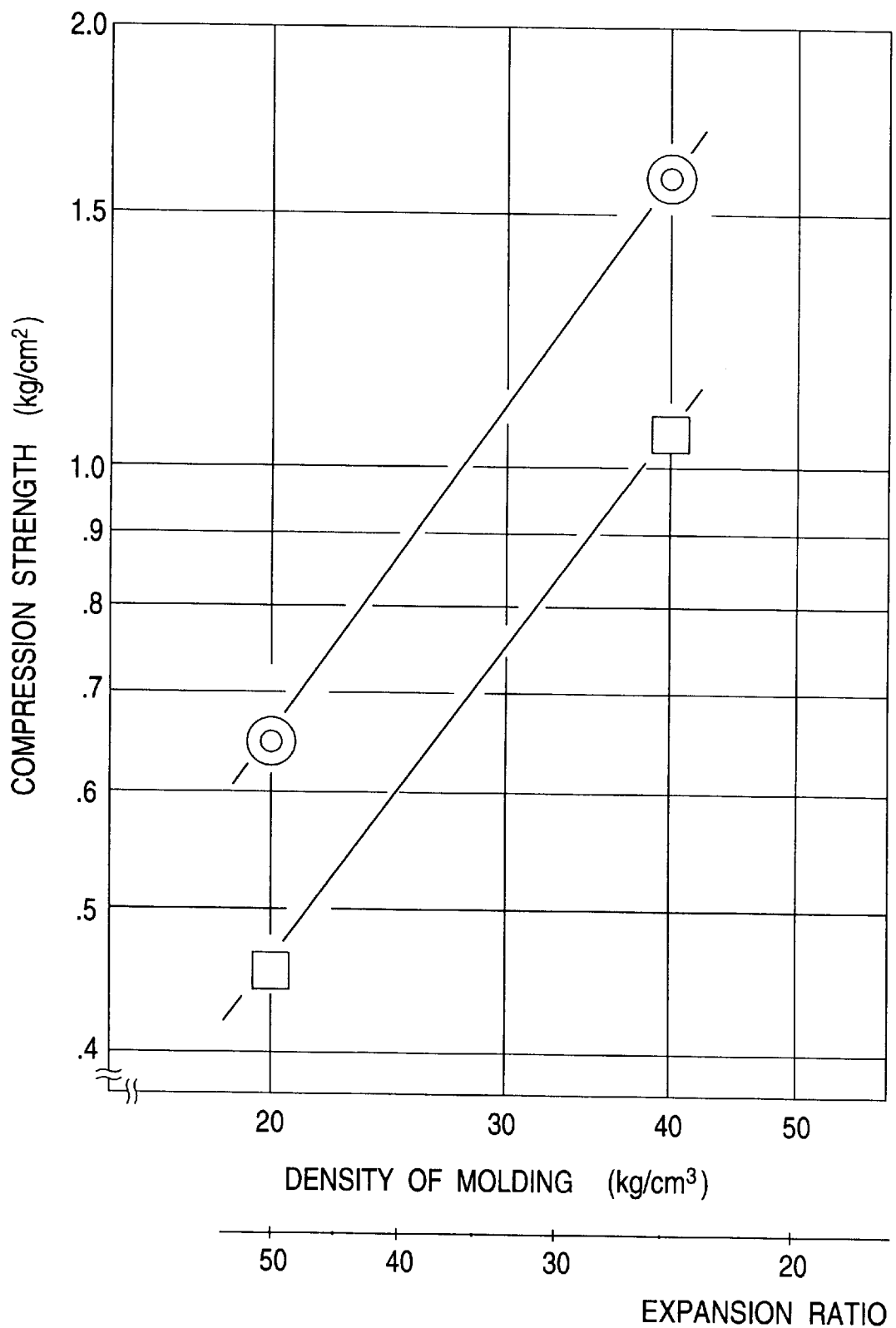
FIG. 2 illustrates a technical effect of use of a resin having a higher density.

In FIG. 2, symbol ◎ indicates a mixed resin according to the present invention which has a density of 0.944 g/cm$^3$, while symbol □ indicates a mixed resin consisting of a high-pressure-process low-density polyethylene (LD), a linear low-density polyethylene (LL), and a linear high-density polyethylene (HD2) and having a mixed-resin density of 0.935 g/cm$^3$. The densities (kg/m$^3$) (and expansion ratios (cc/g)) of moldings are plotted as abscissa and the compression strengths (kg/cm$^2$) of the moldings as ordinate to show the relationship between density and compression strength on a log-log scale. The values of compression strength used here were obtained by examining foamed moldings described in the Examples, specifically by examining the part C shown in FIG. 4. Compression strength is a basic property which governs the cushioning performance of moldings.

The difference in compression strength shown in FIG. 2 is the effect brought about by heightening the density of a polyethylene resin from 0.935 g/cm$^3$ to 0.944 g/cm$^3$. Specifically, the results given in FIG. 2 mean that in the case where the mixed resin having a density of 0.944 g/cm$^3$ is used as a feedstock resin for producing a foamed molding having the same cushioning properties as a foamed molding produced from the prior art mixed resin consisting of a high-pressure-process low-density polyethylene (LD), a linear low-density polyethylene (LL), and a linear high-density polyethylene (HD2) and having a mixed-resin density of 0.935 g/cm$^3$, it is possible to attain a reduction in load-bearing area in cushioning materials, a reduction in foam thickness, or an increase in expansion ratio in moldings by a degree corresponding to that difference in compression strength.

As described above, even a resin having a high density has a wide range suitable for molding and can be used to produce a molding of a complicated shape. In this point, the present invention entirely differs from the prior art techniques (as described in, e.g., JP-A-6-157803) in which it has been thought that the higher the density of a base resin, the narrower the width suitable for molding.

Processes for producing the pre-expanded beads of the present invention are hereafter explained.

For obtaining the pre-expanded beads of the present invention which, when analyzed with a differential scanning calorimeter (DSC), give a fusion endothermic curve comprising a single-peak mountain-shaped curve having a temperature width of 15° C. or more, use may be made as a feedstock resin of a four-component mixed resin obtained by compounding a conventional mixture consisting of a high-pressure-process low-density polyethylene (LD), a linear low-density polyethylene (LL), and a linear high-density polyethylene (HD2) with a linear high-density polyethylene (HD1), as the fourth ingredient, which has a melting point (mHD1) shown by the following expression (1).

$$(mHD2+mLL)/2-2 \leq mHD1 \leq (mHD2+mLL)/2+2 \qquad (1)$$

This four-component mixed resin has a content of the high-pressure-process low-density polyethylene (LD) of from 30 to 50% by weight, a content of the linear low-density polyethylene (LL) of from 5 to 30% by weight, a content of the linear high-density polyethylene (HD2) of from 20 to 45% by weight, and a content of the linear high-density polyethylene (HD1) as the fourth component of from 10 to 35% by weight.

Among the four components, the linear high-density polyethylene resin employed as the fourth component should be noted and described in detail; this fourth component has a density of from 0.940 to 0.954 g/cm$^3$ and a melting point (mHD1) satisfying expression (1) given above and is used in an amount of from 10 to 35% by weight.

In the case where a mixed resin having a resin density of 0.936 (preferably 0.940) g/cm³ or higher is obtained from an LD, LL, and HD2 and this mixed resin is used as a base resin to produce pre-expanded beads, the pre-expanded beads undergo cell breakage, shrinkage, etc. during molding to show poor moldability. This phenomenon is caused by insufficient compatibility in the mixed resin due to too large differences in melting point among the components, i.e., the LD, LL, and HD2.

In in-mold hot molding in which pre-expanded beads are directly heated with steam, the LD and the LL, which have lower melting points, first begin to melt and flow as the temperature thereof increases. In this case, the HD2, having a higher melting point, functions to mitigate the decrease in resin viscosity by inhibiting the disordered flow of the LD and LL to thereby prevent the cell walls of the pre-expanded beads from breaking and maintain the cell structure. In the case where the mixed resin has insufficient compatibility, the LD and the LL, which have lower melting points, melt and flow with increasing temperature without being influenced by the heat-resistant effect of the HD2, which has a higher melting point, to abruptly reduce the viscosity of the resin, resulting in cell wall breakage, shrinkage, etc. If the mixed resin is in a three-component eutectic state in which the LD, LL, and HD2 have been completely dispersed and compatibilized, the viscosity decrease with increasing temperature can be prevented because the LD, LL, and HD2 interlock with one another on a molecular segment level in the mixed resin in a semi-molten state.

However, an LD and an HD2 are generally incompatible with each other. This is attributable mainly to a large difference in molecular structure between the LD and the HD2, i.e., one has a structure having long chain branches and the other has a structure having linear short branches, and to a large difference in melting point (10° C. or more) between the LD and the HD2. It is known that this poor compatibility between an LD and an HD2 can be improved in some degree by adding a low-melting LL, and that when neither the LD nor the HD2 accounts for most of the mixed resin, the two components can be compatibilized almost satisfactorily. However, the complete compatibilization of an LD, LL, and HD2 (formation of an eutectic) is extremely difficult when the mixed resin has an increased resin density so as to accomplish the subject of improving the rigidity thereof. The reasons for the above are that in order to heighten the rigidity of a mixed resin to a level desired in the market, which is generally attained by heightening the density of the mixed resin to 0.940 g/cm³ or higher, the proportion of an HD2 should be greatly increased because of the low density of an LD which is up to 0.930 g/cm³, and that the large HD2 proportion makes it impossible to compatibilize the LD and HD2 by the addition of an LL. If an HD2 having an even higher density is employed so as to heighten the density of the mixed resin as a whole, the result is too large a difference in melting point between the LD and the HD2, making compatibilization more difficult.

The present inventors have found that an LD, LL, and HD2 can be completely compatibilized with one another by adding as the fourth component an HD1 having a melting point between the melting point of the LL (mLL) and the melting point of the HD2 (mHD2). They have further found that when pre-expanded beads obtained from the above mixed resin are analyzed with a differential scanning calorimeter (DSC), the resulting fusion endothermic curve is a single-peak mountain-shaped curve in which the temperature width of the mountain-shaped curve part is 15° C. or more, namely, the above mixed resin can give pre-expanded beads according to the present invention. Proportions of the added HD1 below 10% by weight are undesirable in that the four components show poor compatibility and pre-expanded beads obtained from this mixed resin as a base resin give a fusion endothermic curve comprising a mountain-shaped curve having not a single but two peaks and have impaired moldability. Proportions thereof exceeding 35% by weight are undesirable in that pre-expanded beads obtained from this mixed resin as a base resin give a fusion endothermic curve in which the temperature width of the mountain-shaped part is less than 15° C.

Although the noncrosslinked polyethylene feedstock resin for use in producing the pre-expanded beads of the present invention is desirably a polyethylene resin in a non-crosslinked state, it may have been slightly crosslinked within the range in which the resin is capable of repelletization. In this case, the degree of crosslinking is up to 10% in terms of gel content. Various additive ingredients may be added to the feedstock resin before use, and examples thereof include various fillers, antioxidants, light stabilizers, antistatic agents, flame retardants, lubricants, nucleating agents, pigments, and dyes.

Examples of processes for producing the pre-expanded beads of the present invention include: the so-called "multistage temperature-rising expansion method," which comprises infiltrating a small amount of a foaming agent into resin beads in a pressure vessel, taking out the impregnated resin beads after cooling, transferring the same to a foaming tank, heating the foaming tank to a temperature suitable for foaming to expand the resin beads to thereby obtain expanded beads having a low expansion ratio, forcing an inorganic gas into cells of the expanded beads in a pressure vessel to give expandable expanded beads, and then expanding the expandable beads by heat treatment to obtain expanded beads having a higher expansion; and the so-called "flash expansion method," which comprises dispersing resin beads and a foaming agent into water in the presence of a dispersant in a pressure vessel, infiltrating the foaming agent into the resin beads at a high temperature and a high pressure, and then discharging the mixture of the resin beads and water from the lower end of the vessel into a low-pressure atmosphere to thereby obtain pre-expanded beads. In general, the multistage temperature-rising expansion method is preferred from the standpoint of obtaining highly expanded beads uniform in cell structure, reducing the cost of the transportation of pre-expanded beads, etc.

The resin beads can be obtained from a mixed resin having a composition within the range specified above, by sufficiently melting and kneading the mixed resin with a high-shear kneading extruder, e.g., a twin-screw extruder, to finely disperse the components and bring the same into a homogeneous compatibilized state, extruding the resulting melt into strands with dies, and then cooling the strands with water, followed by cutting.

The temperature to which the resin beads are heated for foaming and expansion is in the range of from the temperature higher by 10° C. than the melting point of the mixed resin to the temperature lower by 15° C. than that melting point. Although the temperature width of the mountain-shaped curve part for the thus-obtained pre-expanded beads is considerably influenced by the composition of the mixed resin used, the temperature width of the mountain-shaped curve part can be increased in same degree by controlling the temperature used for the pre-expansion. The preferred range of the expansion temperature is from the melting point of the mixed resin to the temperature lower by 7° C. than that melting point.

The first-stage expanded beads having a low expansion obtained in the "multistage temperature-rising expansion method" preferably are expanded beads having an expansion of from 1.5 to 3.5 cc/g. This range of expansion is a compromise between a high expansion for economically obtaining highly expanded pre-expanded beads of good quality through the subsequent foaming (expansion) step(s) and a low expansion for the most economical transportation and storage. Namely, first-stage expanded beads having an expansion lower than 1.5 cc/g have a drawback that since the actual number of cells and the cell volume are insufficient, the pressure of a foaming agent (expansion ability) necessary for expansion in a later step is insufficient, making it impossible to obtain satisfactory pre-expanded beads uniform in cell structure. If a foaming agent is forced into such first-stage expanded beads, this makes employment of economical equipments impossible. On the other hand, first-stage expanded beads having an expansion exceeding 3.5 cc/g are undesirable in that not only is the cell structure likely to be disordered in the subsequent expansion step(s), making it difficult to obtain pre-expanded beads of good quality, but also such bulky beads are more costly in transportation and storage. From the above standpoints, the expanded beads produced by the first-stage foaming with a foaming agent preferably have an expansion of from 1.5 to 3.5 cc/g, more preferably from 1.8 to 3.0 cc/g.

In the "multistage temperature-rising expansion method," the step in which a foaming agent is infiltrated into cells of the lowly expanded beads and the impregnated beads are heated to obtain expanded beads having a higher expansion is repeatedly conducted from two to four times so as to finally obtain expanded beads having an expansion of from 6 to 60 cc/g. The expansion range of from 6 to 60 cc/g for the pre-expanded beads provides a wide choice of cushioning properties for foamed moldings to be obtained from the expanded beads by in-mold hot molding. Although the foamed moldings obtained from the expanded beads tend to have an increased expansion as a result of expansion during molding, this increase is not large. Consequently, the target expansion of a molding is mainly governed by the expansion of the pre-expanded beads to be used. On the other hand, in deciding the expansion of a molding for use as a cushioning material, it is necessary to take account of compression strength for withstanding the weight of the object to be packaged and elastic cushioning ability and cushioning-part thickness which are sufficient for shock absorbance. This is intended for providing a wide choice of cushioning properties which the molding exhibits. From th e standpoint of cushioning properties for the main application, the expansion of the pre-expanded beads is desirably as high as from 16 to 60 cc/g. When the "multistage temperature-rising expansion method" comprising at least one step in which a foaming agent is infiltrated into cells of the expanded beads obtained and the impregnated beads are heated to obtain expanded beads having a higher expansion is employed, the first-stage expanded beads which have been regulated to have an expansion ratio of from 1.5 to 3.5 cc/g so as to meet economical transportation and storage can be expanded with an economical apparatus in a place where molding is to be conducted, whereby expanded beads having the final target high expansion can be easily obtained. The cost of an apparatus (including a vessel and pipes) for use in forcing a foaming agent into cells of the first-stage expanded beads varies depending on the pressure used in the apparatus. For example, the current Japanese high-pressure-gas regulation law requires any apparatus using a pressure not lower than 10 kg/cm$^2$ to be highly safe against pressure, which necessitates additional facilities. Further, the equipment should periodically undergo inspection for pressure resistance, and be evaluated based on severe standards. Therefore, the equipment is costly as a matter of course, and should be operated by a trained licensed person. In contrast, with respect to apparatuses using pressures lower than the above-specified value, there is no law severely regulating the same, so that such apparatuses can be very inexpensive and operated by an ordinary operator. In the "multistage temperature-rising expansion method," after the first-stage foaming step has been conducted, the above very inexpensive apparatus can be used to carry out the subsequent steps of forcing a foaming agent and expanding the expanded beads. This is because by stepwise conducting the expansion operation so as to result in a reduced ratio of the expansion ratio of the feedstock expanded beads to that of the final expanded beads, the expansion operation can be conducted at a pressure lower than 10 kg/cm$^2$. In particular, the expansion operation is preferably carried out in two to four steps. In the case where expanded beads having an expansion of 3.5 cc/g are used as a feedstock for obtaining final expanded beads having an expansion of 6 cc/g, the pressure required is about 3 kg/cm$^2$ at the most even when the expansion operation is conducted in one step. In the case where expanded beads having an expansion of 1.5 cc/g are used as a feedstock for obtaining final expanded beads having an expansion of 60 cc/g, the pressure required is about 9 kg/cm$^2$ at the most when the expansion operation is conducted in four steps (e.g., the individual steps result in the same increase in expansion). Thus, the pressure required can be reduced to a value lower than 10 kg/cm$^2$. For example, in the case where the process is carried out in such a manner that the target expansion for the initial foaming is 2.5 cc/g, that for the first-step expansion is 9 cc/g, that for the second-step expansion is 16 cc/g, that for the third-step expansion is 33 cc/g, and that for the fourth-step expansion is 60 cc/g, an apparatus for carrying out the four-step expansion operation is ideal because the apparatus can be easily designed and the pressure required for each step is 9 kg/cm$^2$ at the most. In this case, when the expanded beads to be transported have an expansion of 2.5 cc/g, the beads can be transported efficiently because the bulk volume thereof is about ⅙ of expanded beads with an expansion of 16 cc/g and about ¹⁄₁₂ of expanded beads with an expansion of 30 cc/g. On the other hand, increasing the number of such expansion steps is uneconomical because the procedure becomes more troublesome. In the present invention, pre-expanded beads of good quality are efficiently obtained by the process described above in which each expansion step is conducted so as to expand the beads to 1.5 to 3 times and the number of such expansion steps is up to four.

The foaming agent used in the "flash expansion method" described hereinabove and the foaming agent used for obtaining first-stage expanded beads from resin beads in the "multistage temperature-rising expansion method" are preferably foaming agents having a boiling point not higher than the softening temperature of the resin and having high solubility in the resin. Examples thereof include carbon dioxide, propane, butane, pentane, 1,1,1,2-tetrafluoroethane (F-134a), 1,1-difluoroethane (F-152a), methylene chloride, and ethylene chloride. Preferred of these is carbon dioxide, which conforms to the fluorocarbon regulations and is noncombustible. For stepwise expanding the first-stage expanded beads, it is preferred to use a foaming agent having a boiling point not higher than the softening temperature of the resin and having a small gas permeation constant. Specifically, an inorganic gas such as nitrogen or air is used.

The dispersant used in the "flash expansion method" described hereinabove may be a finely powdered, sparingly water-soluble inorganic substance, e.g., calcium phosphate, magnesium carbonate, or titanium oxide, or a water-soluble polymer, e.g., poly(vinyl alcohol) or methyl cellulose. Those inorganic substances are used in combination with a small amount of a surfactant, e.g., a sodium α-olefinsulfonate or a sodium alkylsulfonate, as a dispersant aid.

For molding a foam from the pre-expanded beads of the present invention, a method using a mold which is capable of imparting foamability and which is capable of being closed but does not come into a sealed state is employed in order to complete in-mold foaming and attain satisfactory fusion among expanded beads. In this method, the pre-expanded beads are packed into the mold and are expansion-molded with steam heating. The impartation of foamability can be accomplished, for example, by forcing an inorganic gas, e.g., air, into the pre-expanded beads to an internal cell pressure of from 0.5 to 1.0 kg/cm$^2$ (gauge pressure), or by compressing the pre-expanded beads to from 85 to 60% of the original bulk volume thereof, or by a combination of both.

For evaluating the properties used in the present invention, the following evaluation methods and evaluation criteria were used.

(1) Expansion Ratio of Expanded Beads (cc/g)

The volume (V, cc) of a known weight (W, g) of expanded beads was measured by the water immersion method, and the expansion ratio thereof (V/W) was obtained by dividing the volume by the weight.

(2) Percentage of Closed Cells (%)

Measurement was made by the air pycnometer method described in ASTM D-2856 (Model 930, manufactured by BECMAN Instruments, Inc.), and the average of n=10 was taken as the percentage of closed cells (%).

(3) Average Cell Diameter (mm)

An expanded bead was cut along three arbitrary perpendicular planes, and the number of cells present in an arbitrary length L (at least 1 mm) on each of the three-dimensional coordinate axes was counted. The average cell diameter was obtained using the following equation.

Average cell diameter (mm)=L (mm)/[Number of cells]

(4) Range Suitable for Molding

Figure 4:
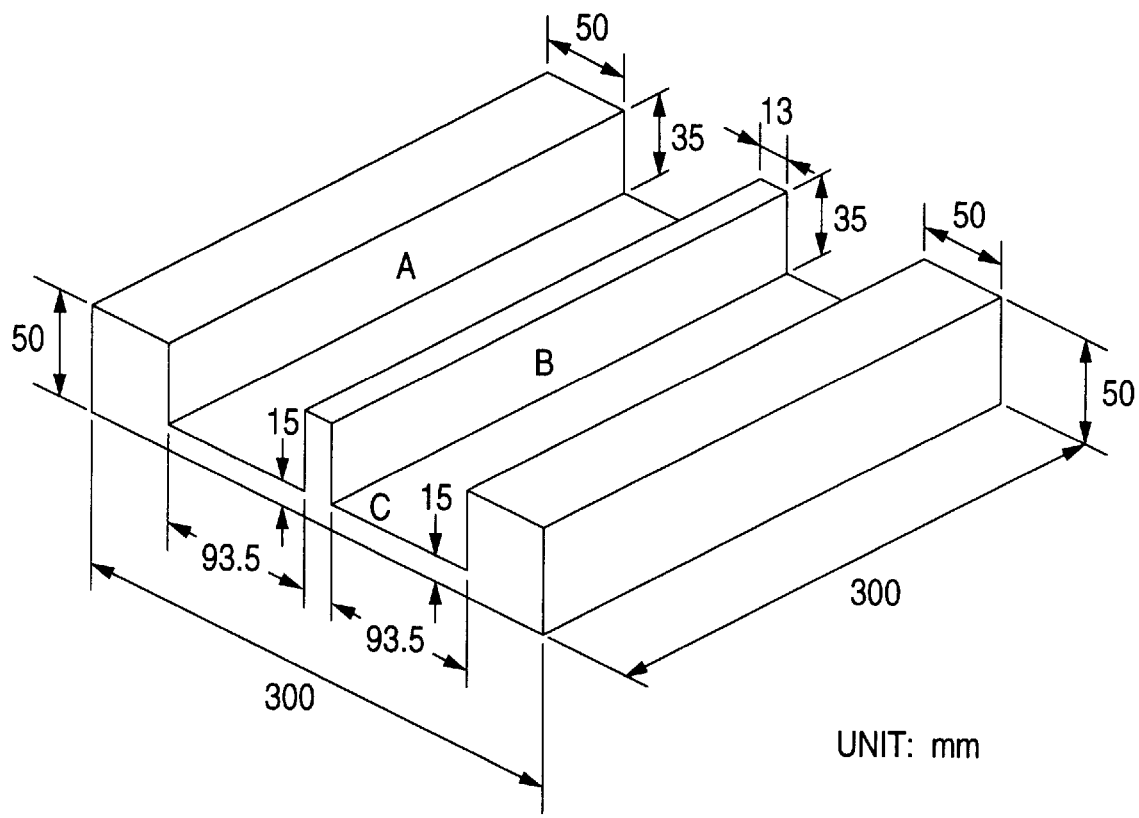
FIG. 4 is a perspective view of a molding for illustrating a mold (thick parts and thin parts of the mold cavity) used for evaluating the present invention.

Moldings having a shape corresponding to the shape of the mold cavity shown in FIG. 4 into which beads are to be packed were obtained. Each of part A (about 50 mm thick), part B (about 13 mm thick), and part C (about 15 mm thick), which parts are shown in FIG. 4, was evaluated for the degree of fusion and shrinkage from mold dimensions based on the following criteria. Moldings rated as ○ with respect to each of the degree of fusion and shrinkage from mold dimensions were regarded as satisfactory, and the difference between the upper and the lower limits of steam pressure necessary in hot molding for obtaining such satisfactory moldings was taken as the range suitable for molding and evaluated based on the following criteria.

| Evaluation Criteria | | |
| --- | --- | --- |
| Group | Symbol | Remarks |
| 0.14 kg/cm$^2$ or higher | ○ | good |
| 0.08 to 0.14 kg/cm$^2$, excluding 0.14 kg/cm$^2$ | Δ | slightly poor |
| below 0.08 kg/cm$^2$ | x | poor |

(i) Degree of Fusion

A 30×30 mm square test piece was cut out of a molding. An incision having a depth of 2 mm was made in the center of the molding, and the incised molding was folded along the incision to cleave the same. The percentage of the number of beads which had undergone cell material breakage to the total number of beads present on the cleavage surfaces (percentage of material breakage) was determined.

| Group | Symbol | Remarks |
| --- | --- | --- |
| Percentage of material breakage, 80% or higher | ○ | excellent |
| Percentage of material breakage, 80 to 60%, excluding 80% | Δ | good |
| Percentage of material breakage, below 60% | x | poor |

(ii) Shrinkage from Mold Dimensions

The shrinkage of molded foams from the dimensions of the mold was evaluated as follows.

| Group | Symbol | Remarks |
| --- | --- | --- |
| 4% or lower | ○ | excellent |
| 4 to 6%, excluding 4% | Δ | good |
| exceeding 6% | x | poor |

(5) Compression Strength

Compression strength is shown in terms of compressive stress at 25% compressive strain measured in accordance with JIS K-6767. Compression strengths A and C are values of the compressive stress for part A (about 50 mm thick) and part C (about 15 mm thick) respectively, which parts are shown in FIG. 3, of the moldings obtained as described above. The compression strength was evaluated as follows.

| Evaluation Criteria | | |
| --- | --- | --- |
| Group | Symbol | Remarks |
| (Moldings of 25 cc/g) | | |
| 1.40 kg/cm$^2$ or higher | ○ | good |
| 1.40 to 1.30 kg/cm$^2$, excluding 1.40 kg/cm$^2$ | Δ | slightly poor |
| below 1.30 kg/cm$^2$ | x | poor |
| (Moldings of 50 cc/g) | | |
| 0.60 kg/cm$^2$ or higher | ○ | good |
| 0.60 to 0.50 kg/cm$^2$, excluding 0.60 kg/cm$^2$ | Δ | slightly poor |
| below 0.50 kg/cm$^2$ | x | poor |

EXAMPLES

The present invention will be explained below in detail by-reference to Examples.

The eleven kinds of polyethylene resins shown in Table 4 were used in the Examples, Comparative Examples, and follow-up experiments.

In the Examples and Comparative Examples, pre-expanded beads were produced by the "multistage temperature-rising expansion method" or the "flash expansion method" under the following basic conditions, and moldings were produced under the following basic conditions.

(1) Production of Resin Beads

Resins shown in Table 4 were melt-kneaded with a twin-screw extruder according to the composition shown in each Example or Comparative Example. The melt was extruded into strands with dies attached to the tip of the extruder. The strands were cooled with water and then cut into granules having a diameter of 0.7 mm and a length of 1.3 mm to produce resin beads.

(2) Production of Expanded Beads (2-1) Multistage Temperature-rising Expansion Method The multistage temperature-rising expansion method capable of yielding ideal expanded beads was used in which the target expansion ratio for the foaming step was 2.5 cc/g, that for the first expansion was 9.0 cc/g, that for the second expansion was 16 cc/g, and that for the third expansion was 33 cc/g.

(Low-Foaming Step)

Resin beads obtained by the above method were placed in a pressure vessel. Carbon dioxide (gas) as a foaming agent was forced into the vessel, and infiltrated into the resin beads under the conditions of a pressure of 30 kg/cm$^2$G and a temperature of 8° C. for 2 to 4 hours. The infiltration amount of carbon dioxide was regulated to 1.6 parts by weight by controlling the infiltration time. Subsequently, the resulting expandable resin beads were introduced into an expanding apparatus (deaerating temperature-rising type). The temperature inside the vessel was increased from 80° C. to a foaming temperature over a period of 20 seconds, and the expandable beads were foamed by heating with steam for 10 seconds while maintaining that temperature. Thus, first-stage pre-expanded beads were obtained. The foaming temperature used was decided beforehand by performing a preliminary experiment with respect to each resin to determine the optimal conditions therefor, as follows. First-stage pre-expanded beads were produced at various foaming temperatures obtained by changing the steam pressure 0.05 by 0.05 kg/cm$^2$ in the range of from 0.50 kg/cm$^2$G to 1.80 kg/cm$^2$G. The first-stage pre-expanded beads obtained at each foaming temperature were aged at ordinary temperature for 1 day, and these samples were then separately examined for expansion ratio, percentage of closed cells, and average cell diameter by the evaluation methods described hereinabove. A sample having an expansion close to the target value of 2.5 cc/g, a high percentage of closed cells, an average cell diameter close to the target value of 0.15 mm, and uniformity in each of these properties was selected based on the results of those examinations, and the temperature at which the selected sample had been foamed was taken as the optimal foaming temperature for the resin.

(First Expansion)

The first-stage pre-expanded beads having an expansion of 2.5 cc/g and obtained in the low-foaming step were placed in a pressurizing heating apparatus. Air was forced into the apparatus to elevate the air pressure at 80° C. over a period of 1 hour, and an air pressure of 8.5 kg/cm$^2$G was maintained for 5 to 8 hours to heighten the internal pressure of the gas (air) within the expanded beads. The amount of air contained in the expanded beads obtained by this treatment was regulated to 6 kg/cm$^2$G in terms of pressure by controlling the time for maintaining that pressure. Subsequently, the expanded beads to which the internal pressure had been imparted were introduced into an expanding apparatus (deaerating temperature-rising type). The temperature inside the vessel was increased from 80° C. to an expansion temperature over a period of 20 seconds, and the expanded beads were heated with steam for 10 seconds while maintaining that temperature. Thus, second-stage pre-expanded beads were obtained. The expansion temperature used was decided beforehand by performing a preliminary experiment with respect to each kind of first-stage expanded beads to determine the optimal conditions therefor, as follows. Second-stage pre-expanded beads were produced at various expansion temperatures obtained by changing the steam pressure 0.05 by 0.05 kg/cm$^2$ in the range of from 0.50 kg/cm$^2$G to 1.80 kg/cm$^2$G. The second-stage pre-expanded beads obtained at each expansion temperature were aged at ordinary temperature for 1 day, and these samples were then separately examined for expansion ratio, percentage of closed cells, and average cell diameter by the evaluation methods described hereinabove. A sample having an expansion ratio close to the target value of 9.0 cc/g, a high percentage of closed cells, an average cell diameter close to the target value of 0.26 mm, and uniformity in each of these properties was selected based on the results of those examinations, and the temperature at which the selected sample had been expanded was taken as the optimal expansion temperature for the resin.

(Second Expansion)

The second-stage pre-expanded beads having an expansion of 9.0 cc/g and obtained in the first expansion were placed in a pressurizing heating apparatus. Air was forced into the apparatus to elevate the air pressure at 80° C. over a period of 3 hours, and an air pressure of 5.0 kg/cm$^2$G was maintained for 3 to 5 hours to heighten the internal pressure of the gas (air) within the expanded beads. The amount of air contained in the expanded beads obtained by this treatment was regulated to 2.5 kg/cm$^2$G in terms of pressure by controlling the time for maintaining that pressure. Subsequently, the expanded beads to which the internal pressure had been imparted were introduced into an expanding apparatus (deaerating temperature-rising type). The temperature inside the vessel was increased from 80° C. to an expansion temperature over a period of 20 seconds, and the expanded beads were heated with steam for 10 seconds while maintaining that temperature. Thus, third-stage pre-expanded beads were obtained. The expansion temperature used was decided beforehand by performing a preliminary experiment with respect to each kind of second-stage expanded beads to determine the optimal conditions therefor, as follows. Third-stage pre-expanded beads were produced at various expansion temperatures obtained by changing the steam pressure 0.05 by 0.05 kg/cm$^2$ in the range of from 0.50 kg/cm$^2$G to 1.80 kg/cm$^2$G. The third-stage pre-expanded beads obtained at each expansion temperature were aged at ordinary temperature for 1 day, and these samples were then separately examined for expansion, percentage of closed cells, and average cell diameter by the evaluation methods described hereinabove. A sample having an expansion close to the target value of 16 cc/g, a high percentage of closed cells, an average cell diameter close to the target value of 0.32 mm, and uniformity in each of these properties was selected based on the results of those examinations, and the temperature at which the selected sample had been expanded was taken as the optimal expansion temperature for the resin.

(Third Expansion)

The third-stage pre-expanded beads having an expansion of 16 cc/g and obtained in the second expansion were placed in a pressurizing heating apparatus. Air was forced into the apparatus to elevate the air pressure at 80° C. over a period of 5 hours, and an air pressure of 5.0 kg/cm$^2$G was maintained for 1 to 3 hours to heighten the internal pressure of the gas (air) within the expanded beads. The amount of air contained in the expanded beads obtained by this treatment was regulated to 3.0 kg/cm²G in terms of pressure by controlling the time for maintaining that pressure. Subsequently, the expanded beads to which the internal pressure had been imparted were introduced into an expanding apparatus (deaerating temperature-rising type). The temperature inside the vessel was increased from 80° C. to an expansion temperature over a period of 20 seconds, and the expanded beads were heated with steam for 10 seconds while maintaining that temperature. Thus, fourth-stage pre-expanded beads were obtained. The expansion temperature used was decided beforehand by performing a preliminary experiment with respect to each kind of third-stage expanded beads to determine the optimal conditions therefor, as follows. Fourth-stage pre-expanded beads were produced at various expansion temperatures obtained by changing the steam pressure 0.05 by 0.05 kg/cm² in the range of from 0.50 kg/cm²G to 1.80 kg/cm²G. The fourth-stage pre-expanded beads obtained at each expansion temperature were aged at ordinary temperature for 1 day, and these samples were then separately examined for expansion, percentage of closed cells, and average cell diameter by the evaluation methods described hereinabove. A sample having an expansion close to the target value of 33 cc/g, a high percentage of closed cells, an average cell diameter close to the target value of 0.40 mm, and uniformity in each of these properties was selected based on the results of those examinations, and the temperature at which the selected sample had been expanded was taken as the optimal expansion temperature for the resin.

(2-2) Flash Expansion Method

Into a pressure vessel were introduced 100 parts by weight of resin beads, 20 to 30 parts by weight of dichlorodifluoromethane as a foaming agent, 300 parts by weight of water, 1 part by weight of powdery basic calcium tertiary phosphate as a dispersant, and 0.006 parts by weight of a sodium n-paraffinsulfonate. The contents were heated to each of given temperatures (90 to 150° C.) with stirring. One end of the pressure vessel was opened while keeping the internal pressure of the vessel at 10 to 50 kg/cm²G to discharge the resin beads simultaneously with the hot water into the atmosphere to expand the beads. Thus, two kinds of pre-expanded beads having expansion of 16 cc/g and 33 cc/g, respectively, were obtained. With respect to the feed amount of the foaming agent, the expansion temperature, and the internal pressure of the pressure vessel, the optimal conditions therefor were employed which had been determined beforehand through preliminary experiments.

(3) Production of Molding

Figure 5:
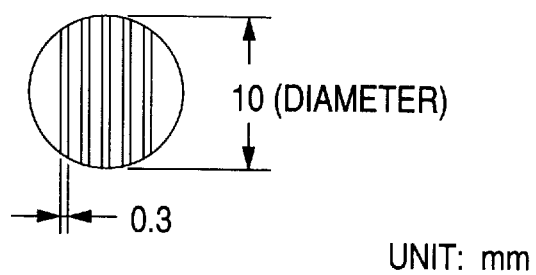
FIG. 5 is a diagrammatic plan view of a steam-introducing member to be disposed on the mold surface.

The pre-expanded beads obtained by the above and other methods were allowed to stand at ordinary temperature and ordinary pressure for 48 hours, and then packed into a pressure vessel. The contents were aged for 48 hours while pressurizing the same with air at 2.5 kg/cm²G. Subsequently, the pre-expanded beads were packed into a general-type mold (consisting of matching male and female molds forming a cavity which, as shown in FIG. 4, had length, width, and height dimensions of 300, 300, and 50 mm, respectively, and contained thick and thin parts, i.e., part A (50 mm thick), part B (13 mm thick), and part C (15 mm thick), the whole inner surfaces of the male and female molds being provided with generally employed steam-introducing members shown in FIG. 5 at a pitch of 20 mm) attached to a molding machine. The packed beads were molded with heating, and the resulting molding was taken out of the mold after cooling. Thus, a molded foam was obtained.

(Method for Evaluating Temperature Range Suitable for Molding)

Molding was conducted at various temperatures obtained by changing the steam pressure 0.02 by 0.02 kg/cm²G in the range of from 1.00 to 2.00 kg/cm²G. The moldings obtained at those molding temperatures were aged and dried at 70° C. for 20 hours, allowed to stand at room temperature for 1 day, and then separately evaluated for the degree of fusion and shrinkage from mold dimensions by the evaluation methods described hereinabove to examine the temperature range suitable for molding in which satisfactory moldings were obtained. In the case where there was completely no temperature range for obtaining satisfactory moldings, the sample is indicated by "none". Based on the results obtained, the optimal molding temperature at which best moldings were obtained was selected. At this selected molding temperature, molding was performed again. The resulting moldings were evaluated for in-mold moldability and material properties by the evaluation methods described hereinabove.

(EXAMPLE 1 AND COMPARATIVE EXAMPLE 1)

The experiments given below were intended to show the importance of the pre-expanded beads according to the present invention. In other words, the experiments demonstrate the fact that the pre-expanded beads of the present invention are the only beads which not only have a wide range suitable for molding but also provide a high-compression-strength molding of a complicated shape where parts considerably different in thickness coexist.

In the following experiments, resin beads were produced according to the "Composition of Resin Beads" for each run number in Table 5 by the method for producing pre-expanded beads described hereinabove. In run Nos. 1 to 6 and run Nos. 12 and 13, expansion was conducted by the multistage temperature-rising expansion method in which the steps of low foaming, first expansion, and second expansion were carried out to produce pre-expanded beads having an expansion of 16 cc/g and the third expansion was then carried out to produce pre-expanded beads having an expansion of 33 cc/g. In each of these experiments, the foaming and expansion were conducted at the preselected steam pressure kg/cm²G (and temperature ° C.) shown in Table 1.

TABLE 1

| | Foaming temperature in low-foaming step kg/cm²G (° C.) | Expansion temperature for the first expansion kg/cm²G (° C.) | Expansion temperature for the second expansion lg/cm²G (° C.) | Expansion temperature for the third expansion kg/cm²G (° C.) |
|---|---|---|---|---|
| Run No. 1 | 1.15 (122.7) | 1.10 (122.0) | 1.10 (122.0) | — |
| Run No. 2 | | | | 1.00 (120.3) |
| Run No. 3 | 1.10 (122.0) | 1.05 (121.0) | 1.05 (121.0) | — |
| Run No. 4 | | | | 1.00 (120.3) |
| Run No. 5 | 1.10 (122.0) | 1.05 (121.0) | 1.05 (121.0) | — |
| Run No. 6 | | | | 1.00 (120.3) |
| Run No. 12 | 0.90 (118.8) | 0.85 (118.0) | 0.85 (118.0) | — |
| Run No. 13 | | | | 0.85 (118.0) |

In run Nos. 7 to 11, expansion was conducted by the flash expansion method to produce pre-expanded beads having an expansion of 16 cc/g. The feed amount of a foaming agent, the expansion temperature, and the internal pressure of pressure vessel on the expansion were set to predetermined values shown in Table 2 below.

TABLE 2

|  | Feed amount of foaming agent (parts by weight) | Expansion temperature (° C.) | Internal pressure of pressure vessel (kg/cm²G) |
| --- | --- | --- | --- |
| Run No. 7 | 25 | 131 | 30 |
| Run No. 8 | 25 | 128 | 28 |
| Run No. 9 | 25 | 126 | 25 |
| Run No. 10 | 25 | 130 | 29 |
| Run No. 11 | 25 | 128 | 28 |

The pre-expanded beads samples obtained by the above experiments were examined for expansion, percentage of closed cells, average cell diameter, and the fusion properties measured by the DSC method described hereinabove. The results obtained are shown in Table 5. Further, with respect to each of the expand beads samples obtained, molding was conducted again according to the method for molding production as described hereinabove at a temperature in the range suitable for molding, specifically at the molding temperature which is shown in Table 5 under Molding Conditions and at which most satisfactory moldings were obtained. The moldings obtained were evaluated for expansion ratio and compression strength by the evaluation methods described hereinabove. The results obtained are shown in Table 5.

The results summarized in Table 5 show that the pre-expanded beads samples according to the present invention which had been produced from specific four-component mixed resins (run Nos. 1 to 6) not only gave a fusion endothermic curve upon analysis with a differential scanning calorimeter (DSC) which curve was a single-peak mountain-shaped curve having a temperature width of the mountain-shaped curve part of 15° C. or more, but also had a wide temperature range suitable for molding and capable of yielding satisfactory products and showed excellent in-mold moldability during production. In contrast, the comparative pre-expanded beads samples produced from mixed resins which each had not contained at least one of the four components used in the present invention, that is, the pre-expanded beads samples produced from an LL/HD1/HD2 mixed resin (run No. 7), from an HD1/HD2 mixed resin (run No. 8), from an LL/HD1 mixed resin (run No. 9), from an LL/HD2 mixed resin (run No. 10), from an LD/LL/HD2 mixed resin (run No. 11), and from an LD/LL/HD2 mixed resin having a resin density below 0.940 g/cm³ (run Nos. 12 and 13), each gave a fusion endothermic curve upon analysis with a differential scanning calorimeter (DSC) which curve either had not a single but at least two peaks or had a temperature width of the mountain-shaped curve part less than 15° C. The results further show that those comparative pre-expanded beads samples had a narrow range suitable for molding, gave moldings with a low compression strength, and were hence unable to accomplish the objects of the present invention.

(EXAMPLE 2 AND COMPARATIVE EXAMPLE 2)

The experiments given below were intended to show the importance of use of a specific four-component mixed resin as a feedstock resin for the pre-expanded beads according to the present invention.

In the following experiments, resin beads were produced according to the "Composition of Resin Beads" for each run number in Table 6 by the method for producing pre-expanded beads described hereinabove. In run Nos. 14 to 30, expansion was conducted by the multistage temperature-rising expansion method in which the steps of low foaming, first expansion, and second expansion were carried out to produce pre-expanded beads having an expansion ratio of 16 cc/g. In each of these experiments, the foaming and expansion were conducted at the preselected steam pressure kg/cm²G (and temperature ° C.) shown in Table 3.

TABLE 3

|  | Foaming temperature in low-foaming step kg/cm²G (° C.) | Expansion temperature for the first expansion kg/cm²G (° C.) | Expansion temperature for the second expansion kg/cm²G (° C.) |
| --- | --- | --- | --- |
| Run No. 14 | 1.15 (122.7) | 1.10 (122.0) | 1.10 (122.0) |
| Run No. 15 | 1.10 (122.0) | 1.10 (122.0) | 1.05 (121.0) |
| Run No. 16 | 1.15 (122.7) | 1.10 (122.0) | 1.10 (122.0) |
| Run No. 17 | 1.20 (123.2) | 1.20 (123.2) | 1.20 (123.2) |
| Run No. 18 | 1.05 (121.0) | 1.05 (121.0) | 1.00 (120.3) |
| Run No. 19 | 1.15 (122.7) | 1.10 (122.0) | 1.10 (122.0) |
| Run No. 20 | 1.15 (122.7) | 1.10 (122.0) | 1.10 (122.0) |
| Run No. 21 | 1.10 (122.0) | 1.10 (122.0) | 1.05 (121.0) |
| Run No. 22 | 1.10 (122.0) | 1.10 (122.0) | 1.05 (121.0) |
| Run No. 23 | 1.20 (123.2) | 1.20 (123.2) | 1.20 (123.2) |
| Run No. 24 | 1.20 (123.2) | 1.20 (123.2) | 1.20 (123.2) |
| Run No. 25 | 1.25 (124.0) | 1.25 (124.0) | 1.25 (124.0) |
| Run No. 26 | 1.20 (123.2) | 1.20 (123.2) | 1.20 (123.2) |
| Run No. 27 | 1.15 (122.7) | 1.15 (122.7) | 1.15 (122.7) |
| Run No. 28 | 1.10 (122.0) | 1.10 (122.0) | 1.05 (121.0) |
| Run No. 29 | 1.20 (123.2) | 1.20 (123.2) | 1.20 (123.2) |
| Run No. 30 | 1.10 (122.0) | 1.10 (122.0) | 1.05 (121.0) |

Each of the expanded beads samples obtained were examined for expansion, percentage of closed cells, average cell diameter, and the DSC fusion properties described hereinabove by the evaluation methods described hereinabove. The results obtained are shown in Table 6. Each expanded beads sample was further used for the production of a molding having an expansion ratio of 25 cc/g according to the method for molding production as described hereinabove to evaluate the temperature range suitable for molding, and the results obtained are shown in Table 6, in which the results of run Nos. 1, 3, and 5 in Example 1 are also shown.

The results summarized in Table 6 show that the expanded beads samples produced from resin compositions within the range specified in the present invention (the samples of run Nos. 1, 3, and 5 were produced from resin compositions in that range, while the samples of run Nos. 14 to 25 were produced from resin compositions on the bounds of that range) not only gave a fusion endothermic curve upon analysis with a differential scanning calorimeter (DSC) which curve was a single-peak mountain-shaped curve having a temperature width of the mountain-shaped curve part of 15° C. or more, but also had a wide temperature range suitable for molding and capable of yielding satisfactory products and showed excellent in-mold moldability during production. In contrast, the comparative pre-expanded beads samples produced from resin compositions outside the range specified in the present invention (run Nos. 26 to 30) each not only gave a fusion endothermic curve upon analysis with a differential scanning calorimeter (DSC) which curve either had not a single but at least two peaks or had a temperature width of the mountain-shaped curve part less than 15° C., but also had a narrow temperature range suitable for molding and capable of yielding satisfactory moldings. The above results demonstrate that the resin composition range specified in the present invention is necessary for accomplishing the objects of the present invention.

TABLE 4

| Symbol of resin | Kind of resin | Density (g/cm³) | MI (g/10 min) | Melting point (° C.) | Kind and amount of comonomer |
|---|---|---|---|---|---|
| I | LD | 0.929 | 2.5 | 118 | none |
| II | LL | 0.915 | 1.0 | 119 | butene-1, 3.0 mol % |
| III | LL | 0.924 | 0.8 | 120 | butene-1, 2.5 mol % |
| IV | LL | 0.928 | 1.0 | 123 | butene-1, 2.1 mol % |
| V | LL | 0.935 | 1.8 | 124 | butene-1, 1.5 mol % |
| VI | HD1 | 0.940 | 2.0 | 125 | hexene-1, 1.0 mol % |
| VII | HD1 | 0.945 | 0.75 | 126 | hexene-1, 0.6 mol % |
| VIII | HD1 | 0.954 | 1.0 | 128 | propylene, 0.4 mol % |
| IX | HD2 | 0.960 | 0.3 | 130 | butene-1, 0.3 mol % |
| X | HD2 | 0.965 | 0.3 | 133 | butene-1, 0.2 mol % |
| XI | HD2 | 0.970 | 1.0 | 135 | none |

TABLE 5

| | Run No. | Composition of resin beads | | | | | | | | Polymer density (g/cc) | Expanded beads obtained | | | | Temperature range suitable for molding, steam pressure kg/cm² G |
|---|---|---|---|---|---|---|---|---|---|---|---|---|---|---|---|
| | | LD Resin | wt % | LL Resin | wt % | HD1 Resin | wt % | HD2 Resin | wt % | | Expansion (cc/g) | Percentage of closed cells (%) | Average cell diameter mm | Fusion property, Number of peaks/Peak width, ° C. | |
| Ex. 1 | 1 | I | 40 | III | 6 | VII | 20 | X | 34 | 0.944 | 16 | 99 | 0.31 | 1/17 | 0.30 ○ |
| | 2 | | | | | | | | | | 33 | 98 | 0.40 | | 0.28 ○ |
| | 3 | I | 40 | III | 10 | VII | 20 | IX | 30 | 0.941 | 16 | 99 | 0.32 | 1/18 | 0.30 ○ |
| | 4 | | | | | | | | | | 33 | 98 | 0.42 | | 0.28 ○ |
| | 5 | I | 40 | III | 15 | VII | 15 | IX | 30 | 0.940 | 16 | 99 | 0.32 | 1/18 | 0.30 ○ |
| | 6 | | | | | | | | | | 33 | 98 | 0.41 | | 0.28 ○ |
| Comp. Ex. 1 | 7 | — | — | III | 39 | VII | 27 | X | 34 | 0.945 | 16 | 97 | 0.32 | 1/10 | 0.06 x |
| | 8 | — | — | — | — | VII | 90 | X | 10 | 0.947 | 16 | 95 | 0.34 | 1/8 | 0.02 x |
| | 9 | — | — | III | 10 | VII | 90 | — | — | 0.943 | 16 | 98 | 0.33 | 1/9 | 0.04 x |
| | 10 | — | — | III | 50 | — | — | X | 50 | 0.944 | 16 | 95 | 0.35 | 1/10 | 0.06 x |
| | 11 | I | 40 | III | 10 | — | — | IX | 50 | 0.944 | 16 | 97 | 0.36 | 2/16 | 0.06 x |
| | 12 | I | 40 | III | 35 | — | — | IX | 25 | 0.935 | 16 | 96 | 0.26 | 2/23 | 0.12 △ |
| | 13 | | | | | | | | | | 33 | 95 | 0.33 | | 0.10 △ |

| | Run No. | Molding conditions Molding temperature, steam pressure kg/cm² G | Properties of foamed molding obtained | | |
|---|---|---|---|---|---|
| | | | Expansion cc/g | Compression strength, kg/cm² Part A | Part C |
| Ex. 1 | 1 | 1.60 | 25 | 1.60 | 1.56 ○ |
| | 2 | 1.60 | 50 | 0.68 | 0.65 ○ |
| | 3 | 1.55 | 25 | 1.50 | 1.45 ○ |
| | 4 | 1.55 | 50 | 0.65 | 0.62 ○ |
| | 5 | 1.52 | 25 | 1.48 | 1.43 ○ |
| | 6 | 1.52 | 50 | 0.64 | 0.62 ○ |
| Comp. Ex. 1 | 7 | 1.46 | 25 | 1.38 | 1.27 x |
| | 8 | 1.48 | 25 | 1.38 | 1.30 △ |
| | 9 | 1.40 | 25 | 1.36 | 1.25 x |
| | 10 | 1.46 | 25 | 1.37 | 1.28 x |
| | 11 | 1.44 | 25 | 1.37 | 1.25 x |
| | 12 | 1.25 | 25 | 1.30 | 1.05 x |
| | 13 | 1.25 | 50 | 0.55 | 0.45 x |

TABLE 6

| | Run No. | Composition of resin beads | | | | | | | Polymer density (g/cc) | Expanded beads obtained | | | | Temperature range suitable for molding, steam pressure kg/cm² G |
| | | LD | | LL | | HD1 | | HD2 | | Expansion (cc/g) | Percentage of closed cells (%) | Average cell diameter mm | Fusion property, Number of peaks/Peak width, ° C. | |
| | | Resin | wt % | Resin | wt % | Resin | wt % | Resin | wt % | | | | | | |
|---|---|---|---|---|---|---|---|---|---|---|---|---|---|---|---|
| Ex. 2 | 1 | I | 40 | III | 6 | VIII | 20 | X | 34 | 0.944 | 16 | 99 | 0.31 | 1/17 | 0.30 ○ |
| | 3 | I | 40 | III | 10 | VIII | 20 | XI | 30 | 0.941 | 16 | 99 | 0.32 | 1/18 | 0.30 ○ |
| | 5 | I | 40 | III | 15 | VIII | 15 | XI | 30 | 0.940 | 16 | 99 | 0.32 | 1/18 | 0.30 ○ |
| | 14 | I | 50 | IV | 20 | VIII | 10 | XI | 20 | 0.940 | 16 | 99 | 0.32 | 1/18 | 0.20 ○ |
| | 15 | I | 50 | III | 5 | VII | 25 | X | 20 | 0.940 | 16 | 98 | 0.32 | 1/17 | 0.20 ○ |
| | 16 | I | 50 | III | 5 | VII | 10 | X | 35 | 0.943 | 16 | 98 | 0.33 | 1/15 | 0.22 ○ |
| | 17 | I | 40 | III | 5 | VII | 10 | X | 45 | 0.947 | 16 | 94 | 0.33 | 1/15 | 0.20 ○ |
| | 18 | I | 40 | IV | 30 | VIII | 10 | XI | 20 | 0.940 | 16 | 98 | 0.32 | 1/18 | 0.20 ○ |
| | 19 | I | 40 | III | 5 | VII | 35 | X | 20 | 0.942 | 16 | 97 | 0.32 | 1/17 | 0.20 ○ |
| | 20 | I | 30 | IV | 30 | VIII | 20 | XI | 20 | 0.942 | 16 | 96 | 0.33 | 1/17 | 0.20 ○ |
| | 21 | I | 30 | III | 15 | VII | 35 | X | 20 | 0.941 | 16 | 96 | 0.32 | 1/17 | 0.20 ○ |
| | 22 | I | 30 | III | 30 | VII | 10 | X | 30 | 0.940 | 16 | 99 | 0.33 | 1/17 | 0.20 ○ |
| | 23 | I | 30 | III | 5 | VII | 35 | X | 30 | 0.945 | 16 | 97 | 0.34 | 1/15 | 0.20 ○ |
| | 24 | I | 30 | III | 15 | VII | 10 | X | 45 | 0.946 | 16 | 94 | 0.32 | 1/15 | 0.20 ○ |
| | 25 | I | 30 | IV | 5 | VIII | 20 | XI | 45 | 0.952 | 16 | 94 | 0.33 | 1/17 | 0.20 ○ |
| Comp. | 26 | I | 40 | III | 10 | VII | 5 | X | 45 | 0.943 | 16 | 93 | 0.30 | 2/18 | 0.10 Δ |
| Ex. 2 | 27 | I | 50 | III | 0 | VII | 20 | X | 30 | 0.943 | 16 | 87 | 0.31 | 2/18 | 0.04 x |
| | 28 | I | 30 | IV | 35 | VIII | 10 | XI | 25 | 0.941 | 16 | 90 | 0.31 | 2/17 | 0.10 Δ |
| | 29 | I | 30 | IV | 20 | VIII | 35 | XI | 15 | 0.944 | 16 | 88 | 0.32 | 2/16 | 0.04 x |
| | 30 | I | 55 | III | 5 | VII | 10 | X | 30 | 0.941 | 16 | 95 | 0.33 | 1/14 | 0.10 Δ |

INDUSTRIAL APPLICABILITY

The present invention succeeded in completing "pre-expanded beads having a wide temperature range suitable for molding as well as sufficient compression strength (expanded beads of good quality)" which have the constitution described above from a polyethylene resin having a density of 0.936 g/cm³ or higher, in particular 0.940 g/cm³ or higher, which resin has conventionally been thought to be difficult to use for realizing such pre-expanded beads. The pre-expanded beads are applicable to in-mold molding for producing moldings of complicated shapes, and are capable of providing a foamed molding which has enhanced compression strength properties and intact cushioning properties and meets desires of the market, e.g., a reduction in load-bearing area, a reduction in foam thickness, and an increase in expansion ratio. Therefore, the present invention can contribute to a comprehensive cost reduction in cushioning materials (foamed moldings).

We claim:

1. Pre-expanded noncrosslinked polyethylene resin beads comprising a mixed resin comprising a high-pressure-process low-density polyethylene, a linear low-density polyethylene, and a linear high-density polyethylene, characterized in that when a result of measurement of said mixed resin with a differential scanning calorimeter (DSC) at a heating rate of 10° C./min is expressed as a fusion endothermic curve, said fusion endothermic curve is a mountain-shaped curve having a single peak, and when a peak point of said mountain-shaped curve is referred to as A, a point of intersection of a perpendicular line drawn from A to the temperature axis and the base line of said fusion endothermic curve is referred to as B, a point interiorly dividing segment AB in said perpendicular line in a ratio of 9:1 is referred to as C, and two points at which a straight line drawn through C and parallel to the temperature axis intersects said fusion endothermic curve are referred to as D and E, a temperature width of said mountain-shaped curve part indicated by a length of segment DE is 15° C. or more; wherein a linear high-density polyethylene (HD1) and a linear high-density polyethylene (HD2) are used as said linear high-density polyethylene, and said linear low-density polyethylene (LL) and said linear high-density polyethylenes (HD1) and (HD2) satisfy the following expression:

$$(mHD2+mLL)/2-2 \leq mHD1 \leq (mHD2+mLL)/2+2$$

(wherein mLL, mHD1, and mHD2 represent melting points of said linear low-density polyethylene (LL), said linear high-density polyethylene (HD1), and said linear high-density polyethylene (HD2), respectively).

2. Pre-expanded noncrosslinked polyethylene resin beads as claimed in claim 1, wherein said mixed resin has a resin density of from 0.936 to 0.952 g/cm³ before pre-expansion.

3. The pre-expanded noncrosslinked polyethylene resin beads according to claim 1, wherein the high-pressure-process low-density polyethylene (LDPE) has a density of from 0.920 to 0.930 g/cm³, a melting point of from 108 to 118° C., and a melt index as measured at 190° C. with a 2.16 kg load of from 0.05 to 30 g/10 min.

4. The pre-expanded noncrosslinked polyethylene resin beads according to claim 1, wherein the linear low-density polyethylene (LLDPE) is a copolymer of ethylene and at least one α-olefin having 3 to 12 carbon atoms.

5. The pre-expanded noncrosslinked polyethylene resin beads according to claim 4, wherein the α-olefin is propylene, 1-butene, 1-pentene, 1-hexene, 1-heptene, 1-octene, 4-methyl-1-pentene, 1-decene, 1-tetradecene, 1-octadecene or mixtures thereof.

6. The pre-expanded noncrosslinked polyethylene resin beads according to claim 5, wherein the linear low-density polyethylene has an α-olefin unit content of from 2 to 10% by mol, a density of from 0.916 to 0.938 g/cm³, a melting point of from 118 to 123° C., and an MI as measured at 190° C. with a 2.16 kg load of from 0.1 to 30 g/10 min.

7. The pre-expanded noncrosslinked polyethylene resin beads according to claim 1, wherein the linear high-density polyethylene (HDPE) is a copolymer of ethylene and at least one α-olefin having 3 to 8 carbon atoms containing short branches and has an α-olefin unit content lower than 2% by mol.

8. The pre-expanded noncrosslinked polyethylene resin beads according to claim 1, wherein HD1 has a density of from 0.940 to 0.954 g/cm$^3$, a melting point of from 123 to 129° C., and an MI as measured at 190° C. with a 2.16 kg load of from 0.05 to 30 g/10 min.

9. The pre-expanded noncrosslinked polyethylene resin beads according to claim 1, wherein HD2 has a density of from 0.955 to 0.970 g/cm$^3$, a melting point of from 128 to 135° C., and an MI as measured at 190° C. with a 2.16 kg load of from 0.05 to 30 g/10 min.

10. The pre-expanded noncrosslinked polyethylene resin beads according to claim 1, wherein the linear high-density polyethylene comprises HD1 and HD2.

11. A process for producing pre-expanded noncrosslinked polyethylene resin beads which comprises steps of infiltrating a foaming agent into beads of a polyethylene resin and expanding said polyethylene resin beads, characterized in that a mixed resin is used as said polyethylene resin, which comprises (i) from 30 to 50 wt % of a high-pressure-process low-density polyethylene resin having a density of from 0.920 to 0.930 g/cm$^3$ and a melting point (mLD) of from 108 to 118° C., (ii) from 5 to 30 wt % of a linear low-density polyethylene resin having a density of from 0.916 to 0.938 g/cm$^3$ and a melting point (mLL) of from 118 to 123° C., (iii) from 20 to 45 wt % of a linear high-density polyethylene resin having a density of from 0.955 to 0.970 g/cm$^3$ and a melting point (mHD2) of from 128 to 135° C., and (iv) from 10 to 35 wt % of a linear high-density polyethylene resin having a density of from 0.940 to 0.954 g/cm$^3$ and a melting point (mHD1) satisfying the following expression (1):

$$(mHD2+mLL)/2-2 \leq mHD1 \leq (mHD2+mLL)/2+2.$$

12. A process for producing pre-expanded noncrosslinked polyethylene resin beads as claimed in claim 11, wherein said mixed resin has a density of from 0.936 to 0.952 g/cm$^3$.

13. A process for producing pre-expanded noncrosslinked polyethylene resin beads as claimed in claim 11, wherein a multistage temperature-rising expansion method is employed, which comprises infiltrating a foaming agent into resin beads, heating the same to obtain lowly expanded beads having an expansion of from 1.5 to 3.5 cc/g, then infiltrating a foaming agent into cells of said lowly expanded beads, and heating the same to obtain expanded beads having a higher expansion.

14. A process for producing pre-expanded noncrosslinked polyethylene resin beads as claimed in claim 13, wherein a step, in which a foaming agent is infiltrated into cells of said lowly expanded beads and the same are heated to obtain expanded beads having a higher expansion, is repeatedly conducted from two or four times, so as to produce expanded beads having an expansion of from 6 to 60 cc/g.

* * * * *